(12) United States Patent
Tsai

(10) Patent No.: US 7,140,565 B2
(45) Date of Patent: Nov. 28, 2006

(54) INDUSTRIAL SCRAP COLLECTOR

(75) Inventor: Ching-Lin Tsai, Taichung County (TW)

(73) Assignee: OAV Equipment & Tools, Inc., Taichung Hsien (TW)

( * ) Notice: Subject to any disclaimer, the term of this patent is extended or adjusted under 35 U.S.C. 154(b) by 309 days.

(21) Appl. No.: 10/889,103

(22) Filed: Jul. 13, 2004

(65) Prior Publication Data

US 2006/0011756 A1 Jan. 19, 2006

(51) Int. Cl.
*B02C 19/00* (2006.01)

(52) U.S. Cl. .................. 241/79.1; 144/252.2; 241/100; 209/142

(58) Field of Classification Search ............. 144/252.1, 144/252.2; 241/92, 100, 79.1; 209/133, 209/719, 142

See application file for complete search history.

(56) References Cited

U.S. PATENT DOCUMENTS 2,839,102 A * 6/1958 Kido ........................... 83/100
4,201,256 A * 5/1980 Truhan ..................... 144/252.2
4,255,169 A * 3/1981 Leliaert et al. ............... 95/273

* cited by examiner

Primary Examiner—Mark Rosenbaum
(74) Attorney, Agent, or Firm—Bacon & Thomas, PLLC

(57) ABSTRACT

A scrap collector is comprised of a separator, a ventilating device, a chipping collecting container, a collecting bag, and a communicating pipe. The separator includes an air chamber, an inlet communicating with the air chamber, and a bottom hole communicating with the air chamber. The ventilating device is mounted on the separator and is provided with an outlet, generating an airflow flowing towards the outlet. The chipping collecting container is mounted under the separator, including an opening connected with the bottom hole of the separator. The collecting bag is mounted inside the chipping collecting container, including an opening in communication with the air chamber. An airtight room is defined between the chipping collecting container and the collecting bag. The communicating pipe has two ends respectively communicating with the air chamber and the room. Accordingly, the pressure inside the collecting bag and the room remains equal.

8 Claims, 4 Drawing Sheets

INDUSTRIAL SCRAP COLLECTOR

BACKGROUND OF THE INVENTION

1. Field of the Invention

The present invention relates generally to scrap collectors for woodworking machines, and more particularly to an industrial scrap collector, which can conveniently collect scrap.

2. Description of the Related Art

Referring to FIG. 4, a common scrap collector 2 for a woodworking machine (not shown), like a planner, a table saw, etc., is comprised of a separator 81 having an inlet 811, a ventilating device 82 mounted above the separator 81 and having a motor and a fan (not shown) for guiding chippings and dust, which are produced during the operation of the woodworking machine (not shown), from an inlet 811 into the separator 81, a chipping collecting can 83 mounted under the separator 81 for collecting heavier ones of the chippings and the dust inside the separator 81, and a dust collecting can 84 for collecting lighter ones of the chippings and the dust inside the separator 81.

During the operation of the scrap collector 2, the user merely has to connect an end of a pipe (not shown) to the inlet 811 of the separator 81 and the other end of the pipe (not shown) to a scrap outlet of the woodworking machine (not shown), and then activate the scrap collector 2, such that the chippings and the dust can be drawn into the separator 81. In the meantime, the heavier chippings and the dust are subject to the gravity to fall to the chipping collecting can 83, and the lighter chippings and dust are subject to the airflow generated by the ventilating device 82 to be drawn into the dust collecting can 84, thereby attaining the primary purpose of maintaining the clean working environment.

When the chipping collecting can 83 is full of scrap, the user has to remove the chipping collecting can 83 away from the separator 81 and then to dump the chipping collecting can 83 to facilitate deserting the scrap directly or in bag. However, the chipping collecting can 83 is made of metal and will be very heavy if it is full of the scrap inside. It often takes at least two people to clean out the scrap inside the chipping collecting can 83, thereby costing the users much working time.

Although the above problem may be improved by placing a common collecting bag, like a plastic bag or a gunny bag, is put inside the chipping collecting can 83 and then fitting the collecting bag to an outlet located at a bottom side of the separator 81 to directly collect the chippings fallen from the inside of the separator 81, the collecting bag is subject to a whirly airflow generated by the ventilating device 82 to frequently cause imbalance of the inside pressure between the separator 81 and the chipping collecting can 83 to further squeeze the collecting bag, such that the bag fails to collect the chippings and the dust.

SUMMARY OF THE INVENTION

The primary objective of the present invention is to provide a scrap collector, which can balance the pressure inside a separator and a dust collecting container to allow the user to quickly clean out the chippings and the dust collected inside the scrap collector.

The foregoing objective of the present invention is attained by the scrap collector, which is comprised of a separator, a ventilating device, a chipping collecting container, a collecting bag, and a communicating pipe. The separator includes an air chamber, an inlet running through a lateral side thereof and communicating with the air chamber, and a bottom hole running through a bottom end thereof and communicating with the air chamber. The ventilating device is mounted on the separator and is provided with an outlet, generating an airflow flowing from the air chamber to the outlet. The chipping collecting container is mounted under the separator, including an opening connected with the bottom hole of the separator. The collecting bag is mounted inside the chipping collecting container, including an opening in communication with the air chamber. An airtight room is defined between an inner side of the chipping collecting container and an outer surface of the collecting bag. The communicating pipe is provided with an end communicating with the air chamber of the separator, and the other end communicating with the room of the chipping collecting container. Accordingly, the pressure inside the collecting bag and the room remains equal to facilitate collecting the chippings and the dust.

DETAILED DESCRIPTION OF PREFERRED EMBODIMENTS

Figure 1:
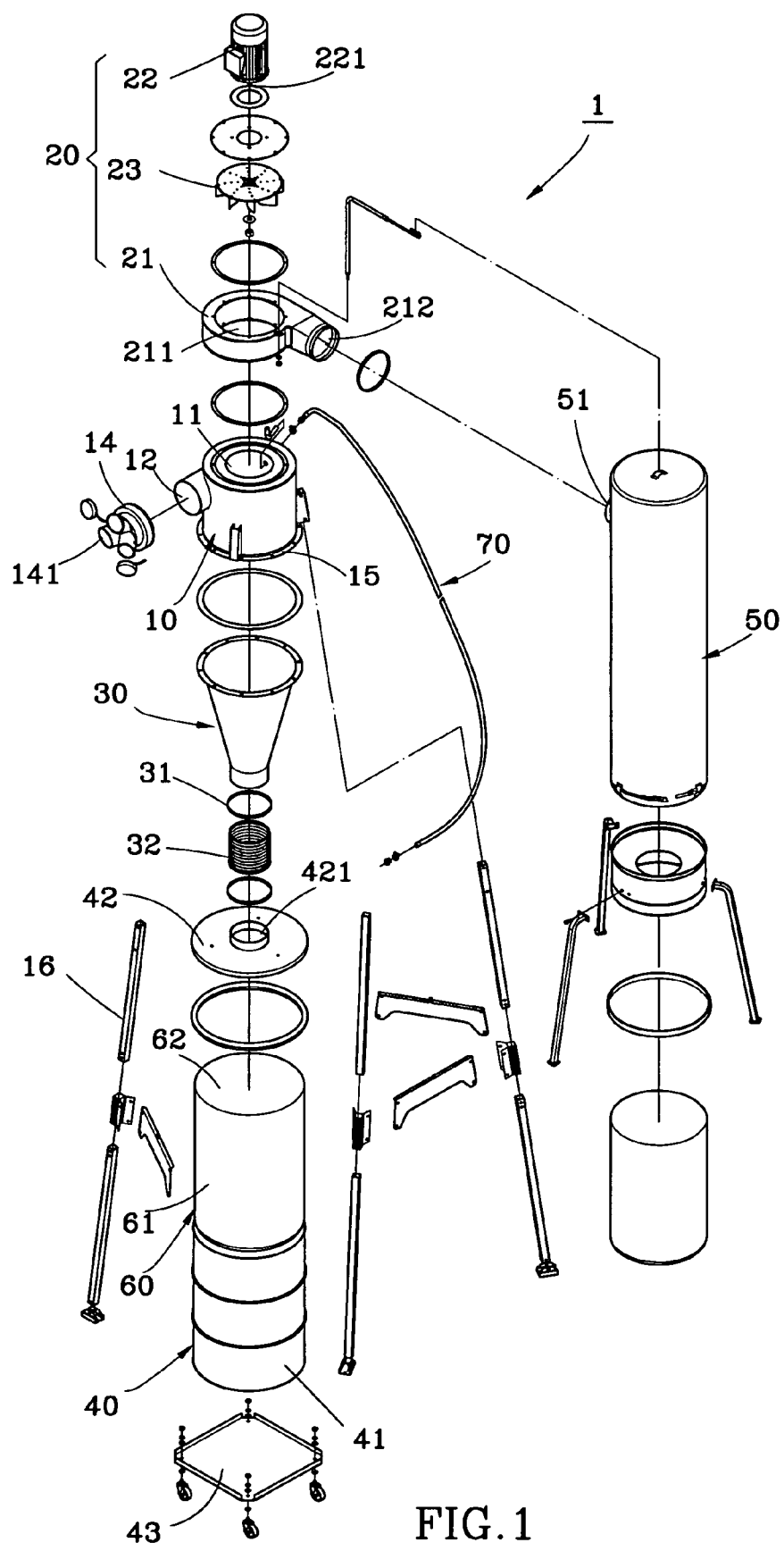
FIG. 1 is an exploded view of a preferred embodiment of the present invention.
Figure 2:
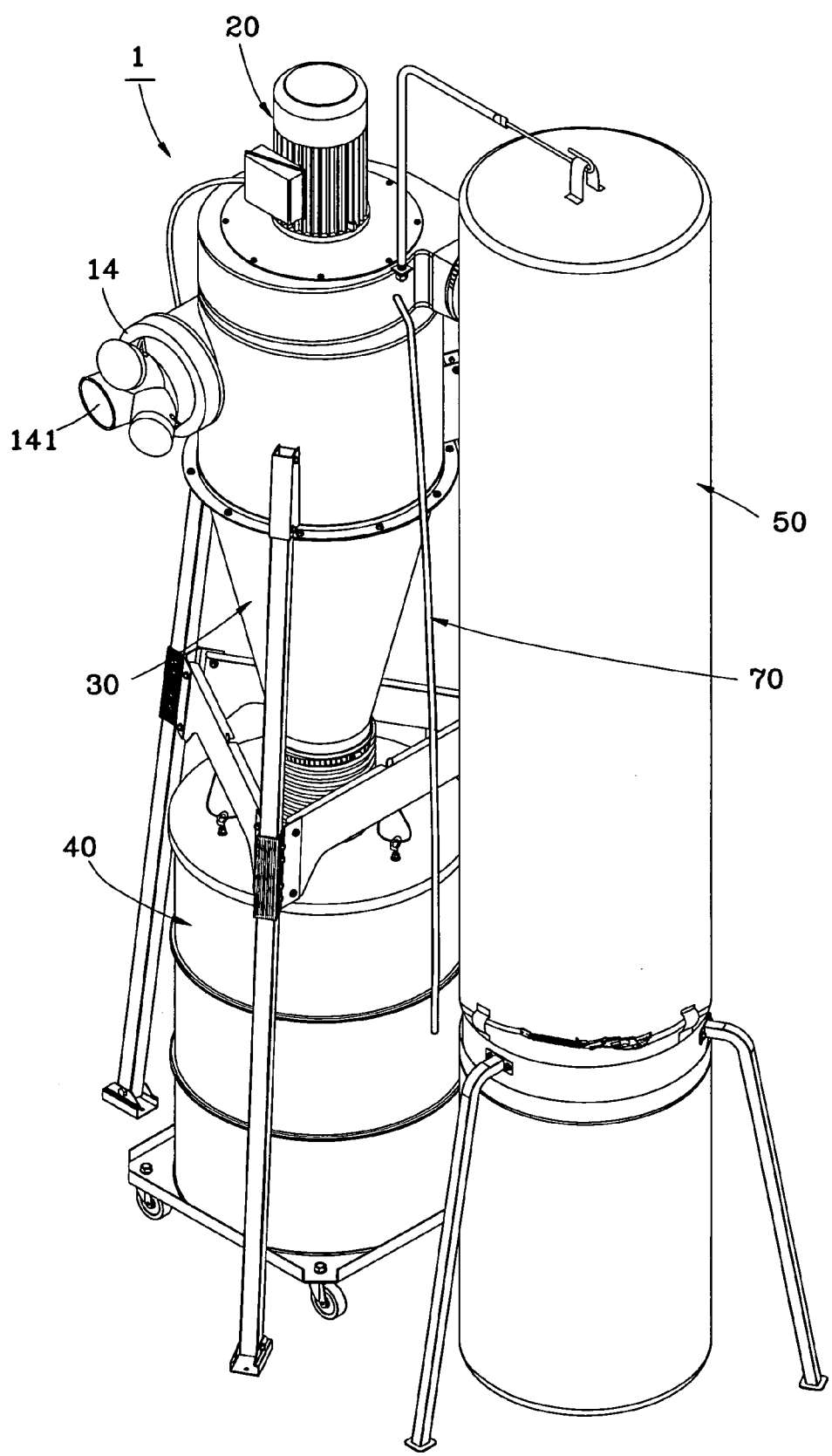
FIG. 2 is a perspective view of the preferred embodiment of the present invention.

Referring to FIGS. 1 and 2, a scrap collector 1 constructed according to a preferred embodiment of the present invention is comprised of a barrel-like separator 10, a ventilating device 20, a funnel-like guide tube 30, a chipping collecting container 40, a dust collecting container 50, a collecting bag 60, and a communicating pipe 70.

The separator 10 includes an air chamber 11 inside, an inlet 12 running through a lateral side of a top end thereof and communicating with the air chamber 11, a branching cap 14 mounted to the inlet 12, a bottom hole 15 running through a bottom end thereof and communicating with the air chamber 11, and a plurality of braces 16 mounted on an outer periphery thereof for supporting and fixing the separator 10 on the ground. The branching cap 14 is provided with at least three apertures 141, each of which is connectable with a retractable tube (not shown) to enable the scrap collector 1 to collect chippings and dust produced by at least three machine tools at the same time.

The ventilating device 20 includes a blower 21, a motor 22, and a fan 23. The blower 21 is mounted on a top end of the separator 10, having a through hole 211 communicating with the air chamber 11 of the separator 10 and an outlet 212 provided at a side thereof abutting the through hole 211. The motor 22 is fixedly mounted on a top end of the blower 21, having an output shaft 221 extending into the through hole 211. The fan 23 is fixedly mounted to the output shaft 221 of the motor 22.

The guide tube 30 is provided with a top end and a bottom end, which diameter is smaller than the top end. The top end of the guide tube 30 is connected with the bottom hole 15 of the separator 10. The bottom end of the guide tube 30 is fitted with an end of a retractable sleeve 32 by a clamp 31.

The chipping collecting container 40 is mounted under the separator 10, including a bucket 41, a lid 42 mounted above the bucket 41, and a slidable rack 43 mounted below the chipping collecting container 40. The lid 42 has a through hole 421, which is formed on a top side thereof and connected with the other end of the retractable sleeve 32.

The dust collecting container 50 is mounted beside the separator 10, including a side hole for connecting the outlet 212 of the blower 21.

The above mentioned components and the results and effects to be attained by them are prior art to be insignificant for the present invention, such that no more recitation is necessary. The key point of the present invention will be specified as follows.

Figure 3:
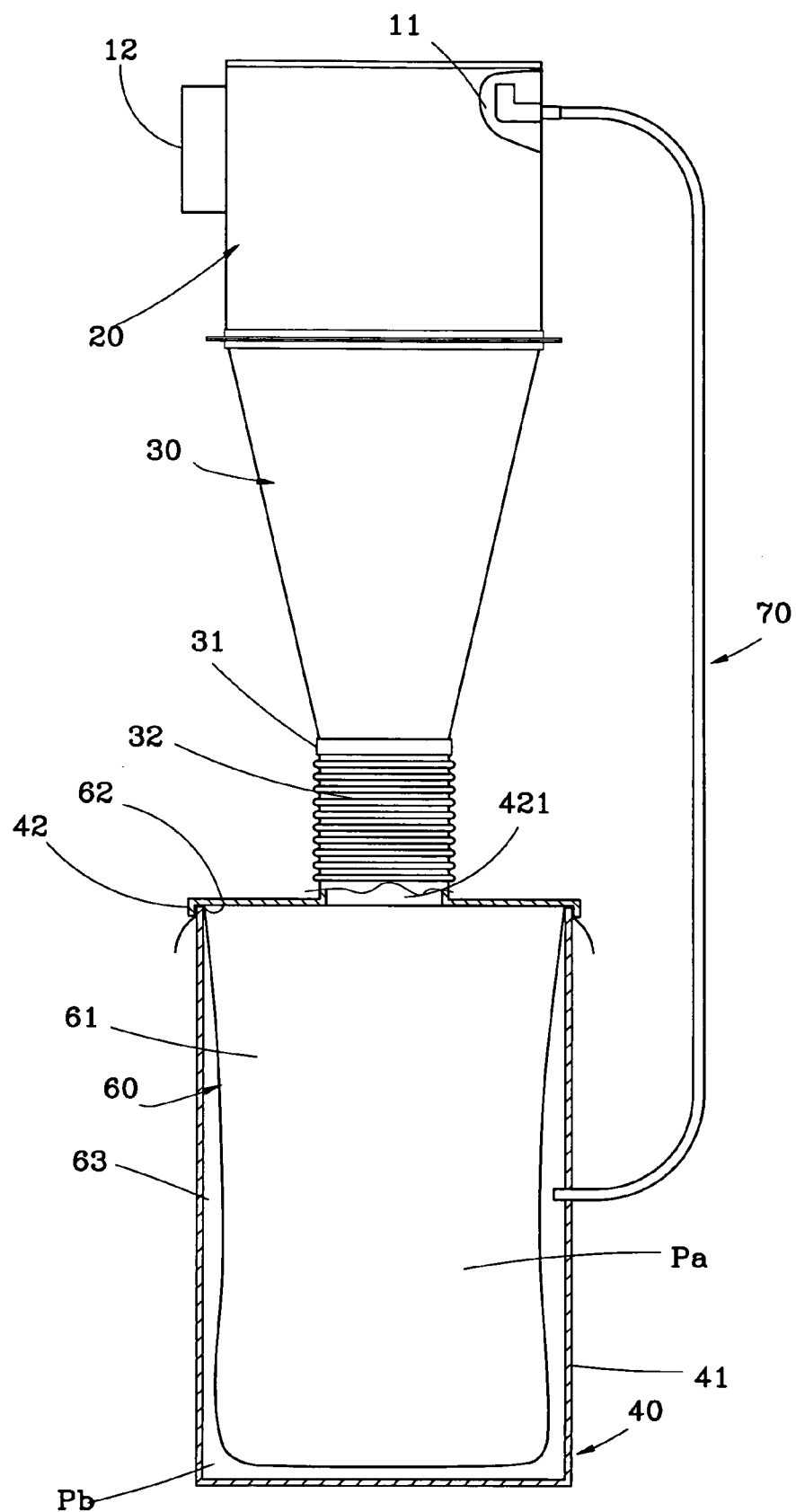
FIG. 3 is a side sectional view of the preferred embodiment of the present invention.
Figure 4:
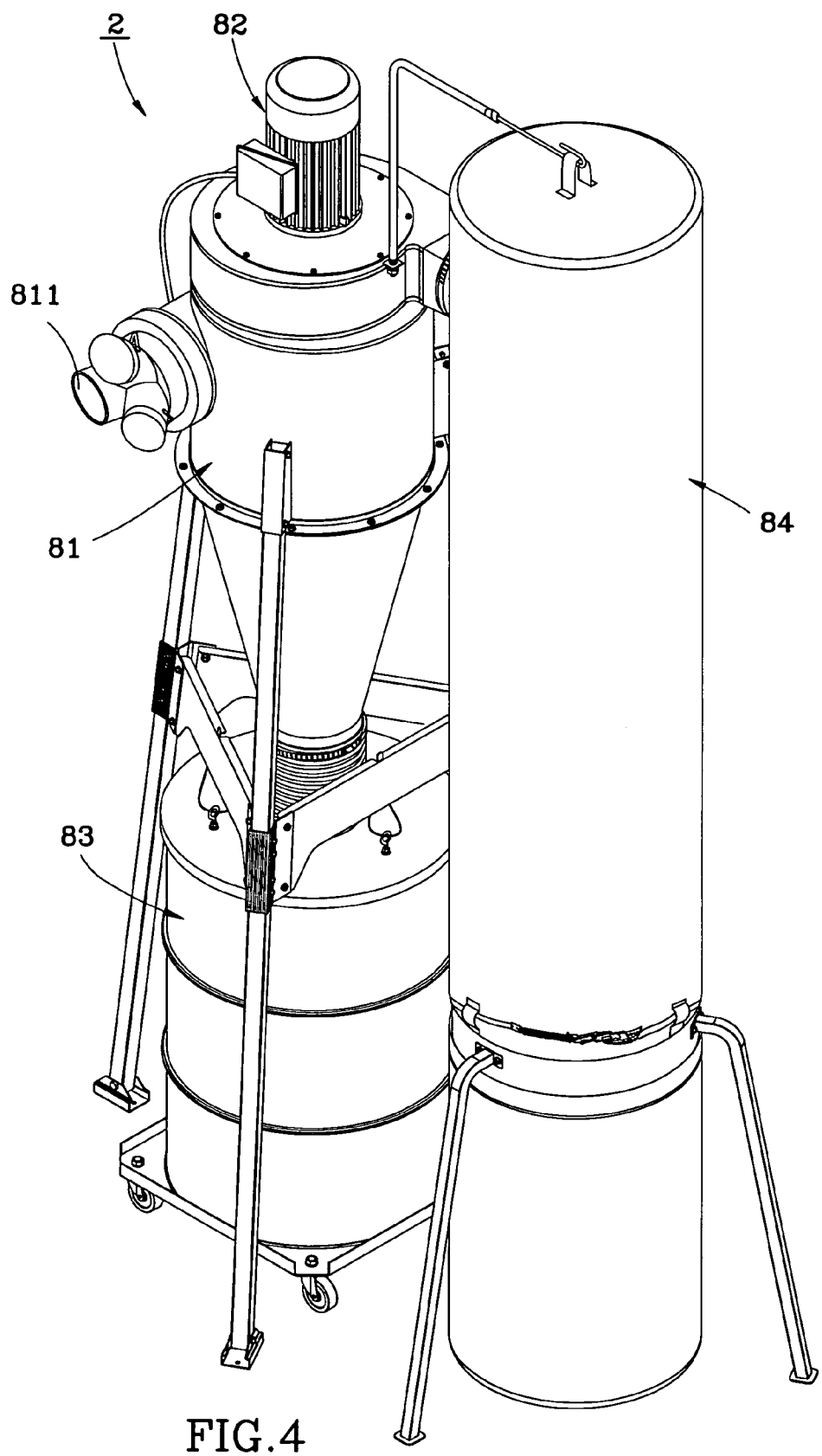
FIG. 4 is a perspective view of the prior art.

The collecting bag 60, as shown in FIG. 3, is a plastic bag in this embodiment and is mounted in the chipping collecting container 40, having a receiving space 61 and an opening 62 located at a top side of the receiving space 61. The collecting bag 60 has an outer periphery around the opening 62 and held between the bucket 41 and lid 42 to communicate the receiving space 61 with the air chamber 11 of the separator 10. An airtight room 63 is defined between an inner side wall of the chipping collecting container 40 and an outer surface of the collecting bag 60.

The communicating pipe 70 has an end running through the separator 10 to communicate with the air chamber 11, and the other end running through the chipping collecting container 40 to communicate with the room 63, for balancing the pressure inside the air chamber 11 and the room 63.

When the motor 22 is activated to drive rotation of the fan 23, the ventilating device 20 generates an airflow flowing towards the outlet 212. The airflow brings the air inside the air chamber 11 out of the outlet 212 and also brings the air outside the separator 10 into the inlet 12. Meanwhile, the pressure inside the air chamber 11 is negative, and the pressure inside the room 63 also becomes negative by means of the communicating pipe 70, such that the pressure inside air chamber 11 and the room 63 is balanced. In other words, the pressure Pa of the air chamber 11 is equal to the pressure Pb of the room 63. Thus, the collecting bag 60 can keep its outer surface close to the inner side wall of the chipping collecting container 40 to enable the receiving space 61 remains the same size rather than being squeezed while the ventilating device 20 is operated.

In the meantime, chippings and dust produced by the machine tools are brought into the inlet 12, wherein the heavier ones are subject to the gravity to directly fall to the collecting bag 60, and the lighter ones are brought by the airflow generated by ventilating device 20 through the outlet 212 into the dust collecting container 50. When the receiving space 61 of the collecting bag 60 is full of the chippings and dust, the user can separate the lid 42 and the bucket 41 of the chipping collecting container 40 from each other and then push the bucket 41 sidewards to together drive the bucket 41 and the slidable rack 43 to slightly move away from the position under the separator 10, such that the user can easily pick up the collecting bag 60 from a top side of the bucket 41, then seal the opening 62 of the bag 60 to desert the bag 60, and finally place a new bag 60 into the bucket 41. Accordingly, it is convenient for the user to quickly clean out the chippings and dust collected in the scrap collector 1.

What is claimed is:

1. A scrap collector comprising:

a separator having an air chamber, an inlet formed at a side thereof and communicating with said air chamber, and a bottom hole formed at a bottom side thereof and communicating with said air chamber;

a ventilating device having an outlet and mounted on said separator for generating an airflow flowing from said air chamber towards said outlet;

a chipping collecting container mounted under said separator and having a through hole formed at a top side thereof for connecting said bottom hole of said separator;

a collecting bag mounted in said chipping collecting container and having an opening in communication with said air chamber of said separator, an airtight room being defined between an outer surface of said collecting bag and an inner side wall of said chipping collecting container; and a communicating pipe having an end communicating with said air chamber of said separator, and the other end communicating with said room.

2. The scrap collector as defined in claim 1, wherein said chipping collecting container comprises a bucket and a lid mounted on said bucket; said through hole of said chipping collecting container is formed on a top side of said lid for communicating with said air chamber of said separator.

3. The scrap collector as defined in claim 1, wherein said ventilating device comprises at least one blower mounted on a top side of said separator and having a through hole and an outlet, at least one motor fixedly mounted a top side of said blower and having an output shaft extending into said through hole of said blower, and at least one fan fixedly mounted to said output shaft of said motor, said through hole of said blower communicating with said air chamber of said separator, said outlet of said blower communicating with said through hole of said blower and extending outwards from a side of said blower.

4. The scrap collector as defined in claim 1 further comprises a guide tube connected between said separator and said chipping collecting container.

5. The scrap collector as defined in claim 4, wherein said guide tube is funnel-like to have an increasing diameter from a bottom end thereof to a top end thereof, said top end communicating with said bottom hole of said separator, said bottom end communicating with said through hole of said chipping collecting container.

6. The scrap collector as defined in claim 1, wherein said separator further comprises a dust collecting container mounted thereabout, said dust collecting container having a side hole connected with said outlet of said ventilating device.

7. The scrap collector as defined in claim 1, wherein said chipping collecting container further comprises a slidable rack mounted below said chipping collecting container.

8. The scrap collector as defined in claim 1, wherein said separator further comprises a plurality of braces mounted to an outer periphery thereof for supporting and fixing said separator on the ground.

* * * * *